(12) United States Patent
Osmanbasic et al.

(10) Patent No.: US 10,023,429 B2
(45) Date of Patent: Jul. 17, 2018

(54) BRAKE FOR ELEVATOR SYSTEMS

(71) Applicant: Inventio AG, Hergiswil (CH)

(72) Inventors: Faruk Osmanbasic, Sins (CH); Daniel Meierhans, Sins (CH)

(73) Assignee: INVENTIO AG, Hergiswil (CH)

(*) Notice: Subject to any disclaimer, the term of this patent is extended or adjusted under 35 U.S.C. 154(b) by 222 days.

(21) Appl. No.: 15/104,275

(22) PCT Filed: Nov. 18, 2014

(86) PCT No.: PCT/EP2014/074909
§ 371 (c)(1),
(2) Date: Jun. 14, 2016

(87) PCT Pub. No.: WO2015/090800
PCT Pub. Date: Jun. 25, 2015

(65) Prior Publication Data
US 2016/0311652 A1    Oct. 27, 2016

(30) Foreign Application Priority Data
Dec. 16, 2013    (EP) .................... 13197453

(51) Int. Cl.
*B66B 5/00*    (2006.01)
*B66B 5/20*    (2006.01)
*G01B 7/14*    (2006.01)
*G01L 1/16*    (2006.01)

(52) U.S. Cl.
CPC .............. *B66B 5/0093* (2013.01); *B66B 5/20* (2013.01); *G01B 7/14* (2013.01); *G01L 1/16* (2013.01)

(58) Field of Classification Search
CPC ....... B66B 5/20; B66B 5/0087; B66B 5/0093; G01B 7/14; G01L 1/16
See application file for complete search history.

(56) References Cited

U.S. PATENT DOCUMENTS

| 5,233,139 A | 8/1993 | Hofmann |
| 5,578,801 A * | 11/1996 | Hofmann .................. B66B 1/28 |
| | | 187/287 |
| 6,176,350 B1 | 1/2001 | Schlosser |

(Continued)

FOREIGN PATENT DOCUMENTS

| DE | 19852040 C1 | 5/2000 |
| EP | 0390972 B1 | 8/1994 |

(Continued)

*Primary Examiner* — Freddie Kirkland, III
(74) *Attorney, Agent, or Firm* — William J. Clemens; Shumaker, Loop & Kendrick, LLP

(57) ABSTRACT

A brake unit for a safety brake of an elevator system has a rolling element on a rolling disk, which rolling element rolls on a stationary rolling track of a braking and guiding rail at least in some sections in the event of an activation of the safety brake. A brake lining of the brake unit interacts with a stationary braking track on the rail as a result of the rolling of the rolling element on the rolling track. At least one marking element on the rolling element produces a start marking and an end marking on the rolling track and/or the braking track when the rolling element rolls on the rolling track. Then the braking distance of the associated elevator car can be determined from the distance between the start marking and the end marking.

13 Claims, 5 Drawing Sheets

(56) References Cited

U.S. PATENT DOCUMENTS 9,061,864 B2 * 6/2015 Spirgi .................... B66B 5/0037
9,791,009 B2 * 10/2017 Hubbard ............... B66B 5/0037

FOREIGN PATENT DOCUMENTS

| EP | 0899231 A1 | 3/1999 |
| EP | 0999168 A2 | 5/2000 |
| FR | 1278304 A | 12/1961 |

* cited by examiner

BRAKE FOR ELEVATOR SYSTEMS

FIELD

The invention relates to a method for determining a braking slide of a brake unit or of an elevator car which is braked by the brake unit.

BACKGROUND

A braking catch device for elevators is known from EP 0 899 231 A1. The known braking catch device comprises a bracket which engages around a guide rail for an elevator car and is arranged in transverse direction with respect to the guide rail. In addition, two brake jaws supported on the bracket are arranged at both sides of the guide rail. One of the brake jaws serves as an active brake jaw. The other brake jaw serves as a passive brake jaw. In that case, the active brake jaw is supported by way of a work eccentric, which is connected with a rolling disc to be secure against relative rotation. The rolling disc and the work eccentric are rotatable about a common fulcrum pin. In that regard, the rolling disc and the work eccentric together form a cohesive actuating element. When triggering takes place, the rolling disc is brought by initial rotation into frictional contact with the guide rail and the rolling disc is thereby further rotated by the still-moving elevator car. The entire braking catch device is thereby drawn in such a way that the passive brake jaw comes into contact with the guide rail. Through further rolling of the rolling disc, the active brake jaw is also led up to the guide rail by way of the work eccentric. After stopping of the elevator car the engaged safety brake can be released again by opposite movement of the elevator car and consequent return rotation of the rolling disc.

The following problems arise in the case of use of a safety brake (braking catch device) for elevator installations, such as is known from, for example, EP 0 899 231 A1. Setting and checking of the safety brake device is usually required for reliable operation within the scope of legal requirements or other specifications at the time of first placing in operation and in a given case also at regular or individually determined intervals in time, such as, for example, in the case of regular maintenance or after emergency braking. Determination of braking slide in a test run is of substantial importance in the context of such checking and setting. In the case of such a test run, for example, a specific load and a specific speed of the elevator car at the instant of triggering of the safety brake can be predetermined. Through pressing of the brake jaws against the guide rails, stress tracks, which in principle can be measured, arise on the guide rails. However, it has proved that such braking tracks or stress tracks are, in practice, often poorly visible. In particular, the exact start point and end point are often difficult to recognize. A supposed possibility consists of coloring the guide rails in the relevant region in order to produce clearer tracks. However, the colorant used then influences friction behavior and thus braking slide. The mentioned processes or methods thus have the common disadvantage that the determined braking slide is liable to a significant degree of inaccuracy or a significant degree of measurement error or that even functioning of the brake can be influenced.

SUMMARY

An object of the invention is therefore to indicate a method for determining braking slide, which method is of better design and, in particular, makes it possible to overcome the mentioned disadvantages. Specifically, it is an object of the invention to indicate a method which enables improved determination of braking slide of a brake unit of a safety brake or of an elevator car of the installation at least in the context of a test run or the like.

Solutions and proposals for a corresponding method fulfilling at least parts of the set object are proposed in the following. Moreover, advantageous additional or alternative developments and refinements are indicated.

The rolling track and/or the braking track can be provided at a guide rail or also at a special rail, particularly brake rail. Such a guide rail or rail and thus also in terms of concept the rolling track and/or the braking track are not a part of the brake unit. A safety brake system can comprise a plurality of brake units, of which one or more brake units is or are provided with marking elements. This also includes the possibility of the safety brake system having several brake units of which only a part, in particular one, is equipped in the manner according to the invention with a marking element, whilst the other brake units are not equipped with such a marking element and for their part contribute only to the braking process. A redundant design is therefore not required since the braking slide determination is usually necessary only for the test run or the like and faulty functioning can be easily recognized here. Accordingly, there is also the possibility in accordance with a concrete embodiment of optionally also equipping the brake unit with a removable marking element which is removed by an authorized person, particularly an installer or service engineer, after the successful test run and setting of the safety brake. Specifically, in a given case the method according to the invention can therefore also be carried by a removable marking element. As a rule this is feasible only if the marking element produces exclusively only a start marking and an end marking, since in this embodiment the marking element has no influence on the actual braking.

At least one start marking on the rolling track and/or the braking track is caused or produced by the marking element during rolling of a rolling element along the rolling track. In that case, the marking element can, however, also produce a series of markings on the rolling track and/or braking track. This is particularly so when the marking element is arranged at the brake lining, in which case when the brake lining is placed against the braking track a marking line—the start of which represents the start marking—arises on the braking track. The rolling element can also be termed rolling curve. It is formed to be curved or rounded at least over a sub-region so that on pivotation of the rolling element a clamping action on the rolling track or guide rail arises.

Moreover, it is advantageous if the marking element when the rolling element rolls back—in which case co-operation of the braking lining with the stationary braking track is cancelled—produces or causes at least one end marking on the rolling track and/or braking track. If the marking element produces a marking line then the end of the marking line represents the end marking.

However, the start marking and optionally the end marking can also each be produced as a marking place on the rolling track and/or braking track. The marking places can then be produced in different ways and thus made recognizable. By marking place there is to be understood in this regard a marking which is formed in a locally limited region of the rolling track and/or braking track and thus is particularly suitable as a start marking or end marking for measuring the distance therebetween.

Depending on the respective use, in a given case production of a start marking on the rolling track and/or the braking track can be sufficient. For example, starting from the start marking a distance to a specific part of the braking unit of the then static safety brake device can be measured. This distance represents a measure, such as the distance between the start marking and the end marking, from which the braking slide can be determined. In order to determine the braking slide use can be made of a linear or non-linear equation which can be described by way of a computation factor, a table or the like. As a rule, braking slide corresponds with the ascertained shortest distance between the start marking and the end marking plus or minus a correction value resulting from the arrangement of the marking element on the rolling element and the geometric design of the brake. This correction value is preferably ascertained or verified by means of a series of tests.

The marking element can thus be advantageously arranged, depending on the respective use, at the brake lining or in preferred manner at the rolling element or at a rolling disc at which the rolling element is formed. Moreover, the marking element can, depending on the respective use, advantageously be connected with the brake lining or rolling disc to be non-releasably or releasably couplable.

The start marking and optionally also the end marking can alternatively be an electronic marking. In that regard, for example, the rolling element comprises a pressure-based signal transmitter which issues a signal when it is rolled over. This can be, for example, a piezo-element. A position of the elevator car is detected when this signal occurs and is output or stored as a start marking or, in the case of rolling back, as an end marking. The position can then be prepared in a positioning system present in the elevator. In this solution a distance between start marking and end marking no longer has to be subsequently measured manually, but can be ascertained directly on the basis of the stored positional data of the elevator car.

The material for the marking element can advantageously be selected with respect to the respective case of use. For example, a soft metallic material can be employed for the brake lining. Specifically, brass or a material based on brass can be used for the brake lining. The marking element can then, for example, be formed from a hard metallic material or a ceramic material, which leaves behind a deeper impression, particularly a deeper groove, in the guide rail. In particular, a combination of the brake lining formed from brass and the marking element formed as a hardened cone is advantageous. In a modified embodiment the friction lining can, however, also be formed from a hard metallic material, particularly a hardened steel.

In that regard, it is additionally advantageous if the marking element has a point, particularly a conical point, which faces the rolling track and/or the braking track at least during generation of the start marking or the end marking and optionally also during generation of a marking line. The marking element can also be formed from several materials. In particular, the conical point can also be formed from a metallic material with a ceramic coating.

If the marking element is provided at the rolling element, then the marking element can be advantageously formed by at least one recess in the rolling element. In that case, the marking element can also be formed by a bore in the rolling element. The pattern produced on the rolling track by the rolling element when rolling along the rolling track then has a place which is left free and which is produced by the recess in the rolling element. This marking place is thus readily recognizable. Specifically, in this way the start marking and the end marking can be produced as marking places. The spacing between the start marking and the end marking can then be easily measured by the authorized person.

In corresponding manner, the marking element can also be formed by a first lateral recess at the rolling element and a second lateral recess at the rolling element, between which a narrowed section of the rolling element is formed. An interruption of the characteristic pattern arising when the rolling element rolls along the rolling track thereby results. The narrowed section of the rolling element can be formed as, in particular, a web-shaped section of the rolling element. In this way, marking places, namely the start marking and the end marking, can be produced on the rolling track.

In the design of the brake unit, an active brake jaw is preferably mounted on an eccentric axle, wherein the eccentric axle during rolling out or rolling back of the rolling element presses the brake jaw against the braking track to increasing or decreasing extent. Thus, during rolling of the rolling element along the rolling track the braking force can initially increase, since the brake jaw is increasingly pressed against the braking track. A progressive development of braking force is thereby possible. For release, rolling back of the rolling element takes place, in which case during rolling back of the rolling element the brake jaw is pressed against the braking track to decreasing extent. Thus, during rolling back of the rolling element there is still a certain pressing force of the rolling disc against the rolling track and the brake jaw against the braking track. Depending on whether the marking element is provided at the rolling element or the brake lining, a sufficient pressing force thus still arises in order to reliably generate the end marking on the rolling track and/or braking track. In the case of an arrangement of the marking element at the rolling element this is disposed in such a way that through pressing of the rolling element against the rolling or braking track a clear pattern is imprinted therein.

For the design of the brake unit a construction corresponding with overlapping of the rolling track and the braking track usually arises. This makes possible a compact design and an advantageous force transmission. However, in that regard the characteristic structures, particularly grooves, which arise during rolling of the rolling element along the rolling track can also be wiped over by the brake lining and thus smoothed, changed and/or superimposed. The image of the entire process therefore manifests itself to a certain extent in the form of grooves or the like which are produced by rolling of the rolling element along the rolling track and are obliterated by the co-operation of the brake jaw with the braking track. In that case, especially the start and end of the characteristic groove structure produced by rolling of the rolling element along the rolling track are usually no longer precisely recognizable. However, by way of the start and end markings produced by the marking element it is possible to determine a distance which is a measure for braking slide. The exact start and exact end of the characteristic groove structure produced by rolling of the rolling element along the rolling track then no longer has to be determined. The inaccuracy with respect thereto is thus eliminated from the determination of the braking slide.

Determination of the braking slide of the brake unit of the safety brake for elevator installations can thus be carried out. In that regard, the method can be advantageously developed in appropriate ways.

DESCRIPTION OF THE DRAWINGS

Preferred embodiments of the invention are explained in more detail in the following description on the basis of the accompanying drawings, in which corresponding elements are provided with corresponding reference numerals and in which.

DETAILED DESCRIPTION

Figure 1:
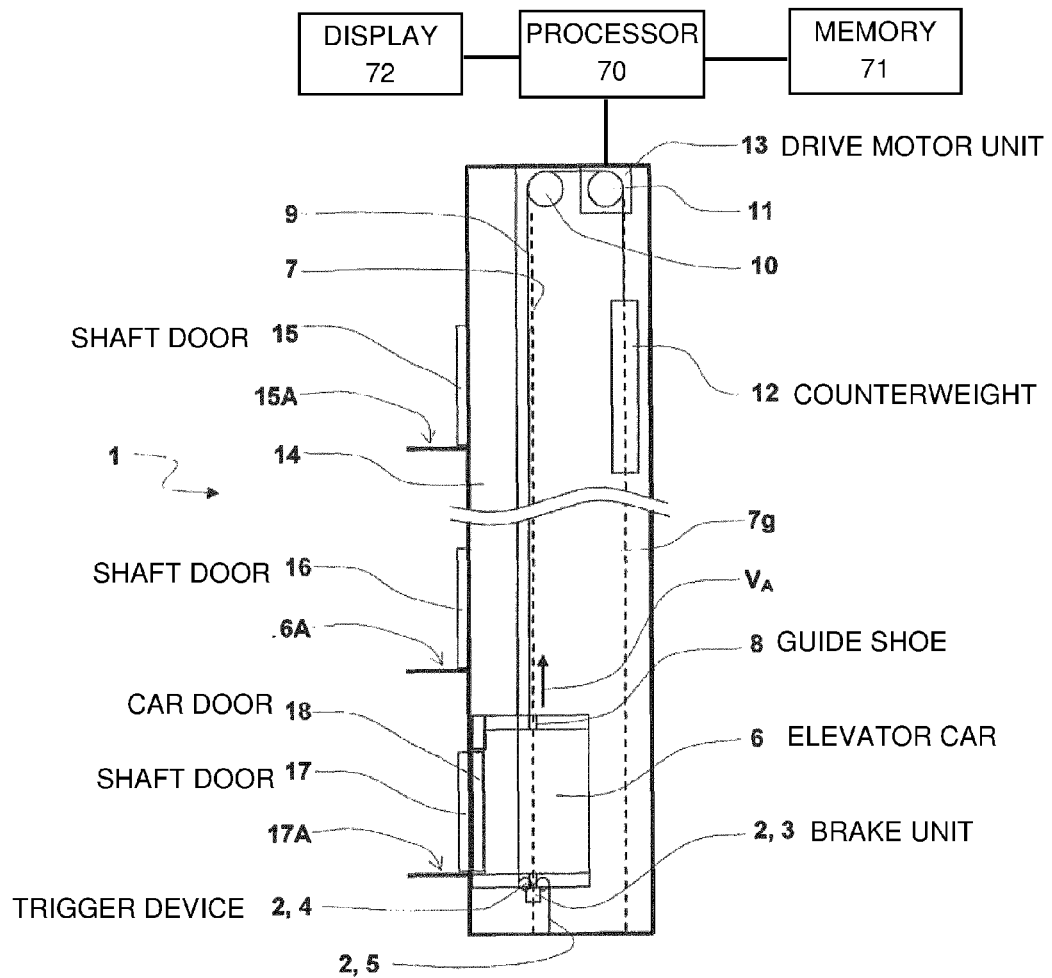
FIG. 1 shows an elevator installation with a safety brake, which comprises at least one brake unit, in schematic illustration in the manner of a detail in correspondence with a first embodiment of the invention.

FIG. 1 shows an elevator installation 1 with a safety brake 2, which comprises at least one brake unit 3, a trigger device 4 and a trigger cable 5, in a schematic illustration and in the manner of a detail in correspondence with a first embodiment.

The elevator installation 1 comprises an elevator car 6. The elevator car 6 serves for receiving persons and/or objects. Transport of persons, luggage and the like can thereby be realized, or also an elevator installation 1 serving as a freight elevator 1, which serves for, for example, transport of goods.

The brake unit 3 of the safety brake 2 co-operates with a rail 7. The rail 7 is schematically illustrated in FIG. 1 by a dashed line. In this embodiment the elevator car 6 is guided by means of guide shoes equally at the rail 7 or along the rail 7. In this embodiment the rail 7 is thus constructed as a brake and guide rail 7.

In a modified embodiment the rail 7, which co-operates with the brake unit 3 of the safety brake 2, can also be constructed as a pure brake rail 7. A separate guide rail can then be provided for guidance of the elevator car 6 so as to guide the elevator car 6 by means of the guide shoe 8 at the separate guide rail. Moreover, for simplification of the illustration only one brake unit 3 and only one rail 7 are illustrated. In practice, the car 6 is guided at at least two rails, wherein these rails can be the rail 7. Moreover, a further rail designed in correspondence with the rail 7 can also be provided, which further rail co-operates with a further brake unit designed to correspond with the brake unit 3. In addition, it is also possible for the safety brake 2 to comprise a further brake unit which, together with the brake unit 3, co-operates with the rail 7. The safety brake 2 can thus comprise a suitable number of brake units which make up the brake unit 3. Specifically, the safety brake 2 can comprise two brake units—of which one is the brake unit 3—which co-operate with two rails, of which one is the rail 7.

The elevator car 6 is supported at a support means 9. The support means 9 is guided by way of a deflecting roller 10 and a drive pulley 11 and at the other end connected with a counterweight 12. The counterweight is similarly guided along counterweight rails 7g. The drive pulley 11 is driven by a drive motor unit 13 so as to move the elevator car 6 in an elevator shaft 14. In this embodiment the drive motor unit 13 is arranged in the elevator shaft 14. In a modified embodiment the deflecting roller 10, the drive motor unit 13 and drive pulley 11 can, however, also be accommodated in a separate engine room.

In addition, individual shaft doors 15, 16, 17, which are associated with a car door 18 of the elevator car 6 when the elevator car 6 stops at the respective floor 15A, 16A, 17A, are provided.

In this embodiment the support means 9 at the same time serves as traction means 9 in order to not only accept the weight force of the elevator car 6, but also to transmit the drive forces, which are transferred by the drive pulley 11 to the support means 9, of the drive motor unit 13 to the elevator car 6. The same applies to the counterweight 12. The trigger cable 5 is independent of the support means 9. In this embodiment the trigger cable 5 is arranged in stationary position in the elevator shaft 14. In the case of a modified embodiment the trigger cable 5 can, however, also be movable. Specifically, the trigger cable 5 can be guided by way of suitable rollers, wherein movement in closed circulation of the trigger cable 5 is possible by way of a connection of the trigger cable 5 with the elevator car 6. In both cases a speed $v_A$ can be determined from a relative movement of the trigger cable 5 or a part of the trigger cable 5 with respect to the elevator car 6 or with respect to the shaft 14 (in the case of a trigger or speed limiter cable 5 arranged to be movable). The trigger device 4 can then trigger the safety brake 2 when the speed $v_A$ of the elevator car 6 exceeds a predetermined limit speed $v_G$. Additionally or alternatively other settings for triggering the safety brake 2 can also be realized if the trigger device 4 is designed to be correspondingly modified. For example, an electronic limiter, which monitors travel movements of the elevator car, can be used. An electronic limiter of that kind actuates, when required, the safety brake by way of an electromechanical device. For example, safety during entering or leaving or during loading or unloading can also be improved. If, for example, the elevator car 6 is located on the floor 17A, as illustrated in FIG. 1, and the car door 18 as well as the shaft door 17 are opened, then in the case of sudden, faulty slipping of the elevator car 6 upwardly with a positive speed $v_A$ of the elevator car 6 an accident can occur. In order to prevent such an accident the trigger device 4 can trigger the safety brake 2, for example, already after a predetermined travel path. The same also applies to slipping downwardly.

Figure 2:
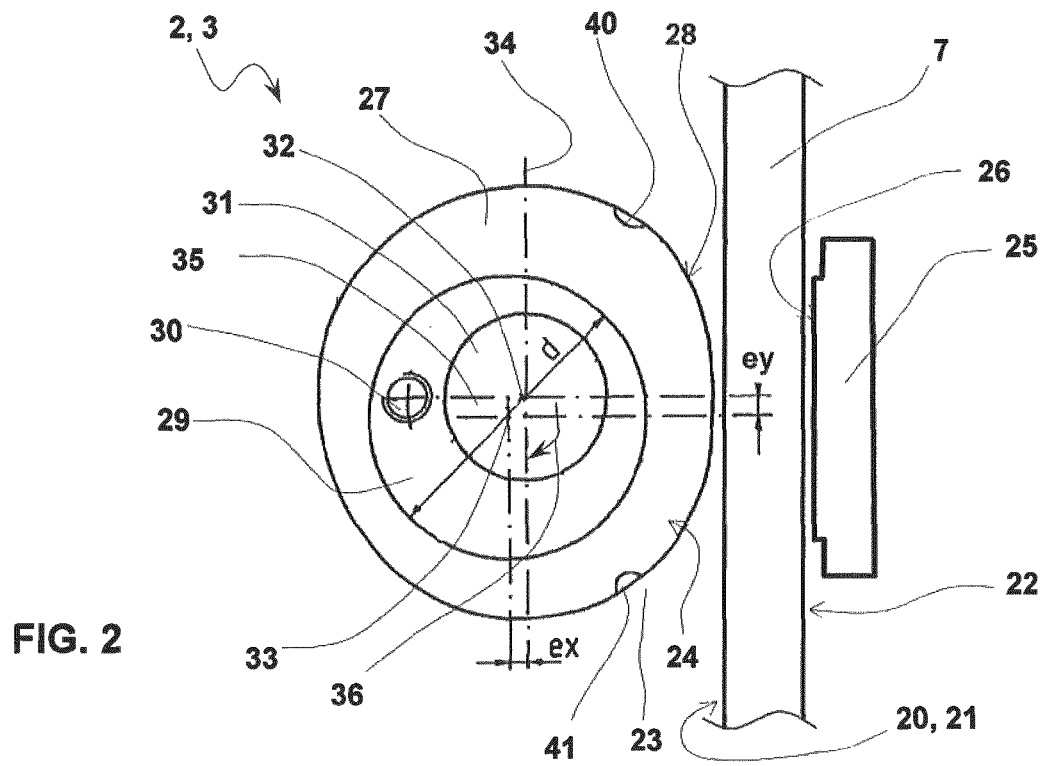
FIG. 2 shows the brake unit and a rail of the elevator installation, which is illustrated in FIG. 1, of the first embodiment of the invention in a schematic illustration and in the manner of a detail, in released state.

FIG. 2 shows the brake unit 3 of the safety brake 2 and the rail 7 of the elevator installation 1, which is illustrated in FIG. 1, of the first embodiment in a schematic illustration and in the manner of a detail in the released state. Provided at the rail 7 are a rolling track 20 and a braking track 21, which at least partly overlap. In that regard, the rolling track 20 and the braking track 21 can also entirely or largely correspond. In a modified embodiment it is equally conceivable for the rolling track 20 and the braking track 21 to differ from one another and, for example, to extend parallelly to one another. In addition, a further braking track 22 is provided at the rail 7.

The brake unit 3 comprises a brake jaw 23 with a brake lining 24. In addition, the brake unit 3 comprises a further brake jaw 25 with a brake lining 26. The brake lining 24 of the brake jaw 23 is associated with the braking track 21. The brake lining 26 of the further brake jaw 25 is associated with the further braking track 22. In this embodiment the further brake jaw 25 is constructed as a passive brake jaw 25, whilst the brake jaw 23 is constructed as an active brake jaw.

The brake unit 3 comprises a rolling disc 27 at which a rolling curve or a rolling element 28 is formed. In addition, the brake unit 3 comprises a work eccentric 29 which is connected with the rolling disc 27 to be secure against relative rotation. In that regard, the rolling disc 27 and the work eccentric 29 can be of integral construction or they can be composed of several parts. The composite of rolling disc 27 and work eccentric 29 is rotatably mounted on an axle 31. The composite of rolling disc 27 and work eccentric 29 can be rotated when required by way of a connecting element 30, for example a threaded coupling.

In this embodiment the axle 31 has an axis 32 of rotation. The work eccentric 29 has, with respect to its diameter d, a center axis 33 or a center point 33. The center axis 33 in that case differs from the rotational axis 32. In this embodiment the center axis 33 of the work eccentric 29 is offset along the rolling track 20 by the vertical eccentricity ey. Moreover, the center axis 33 is offset with respect to the rotational axis 32 by the horizontal eccentricity ex perpendicularly away from the rolling track 20. Indicated for the rolling disc 27 in this embodiment are axes 34, 35 oriented perpendicularly to one another. The axis 34 is a vertical axis 34 and the axis 35 is a horizontal axis 35. In this embodiment the rolling element 28 and the rolling disc 27 are formed to be asymmetrical with respect to the horizontal axis 35. The horizontal axis 35 is therefore a horizontal work axis 35. As a result, a different behavior in the case of starting in upward direction or downward direction can be realized. In a modified embodiment the rolling element 28 can, however, also be formed symmetrically with respect to the horizontal axis 35.

In this embodiment according to FIG. 2, an asymmetrical behavior during rolling of the rolling disc 27 along the rolling track 20 with respect to starting of the elevator car 6 in the case of movement upwardly or downwardly is achieved by the eccentricity caused by the vertical eccentricity ey.

When the trigger device 4 triggers the safety brake 2, the composite of rolling disc 27 and work eccentric 29 is then rotated in or against a rotational direction 36 about the rotational axis 32. Rotation in the rotational direction 36 is concerned in this embodiment. Through triggering in or against the rotational direction 36 safety-braking of the elevator car 6 in the case of movement thereof both upwardly and downwardly can take place.

The construction and mode of functioning of the brake unit 3 of the safety brake 2 in correspondence with the first embodiment are further described in the following also with reference to FIG. 3.

Figure 3:
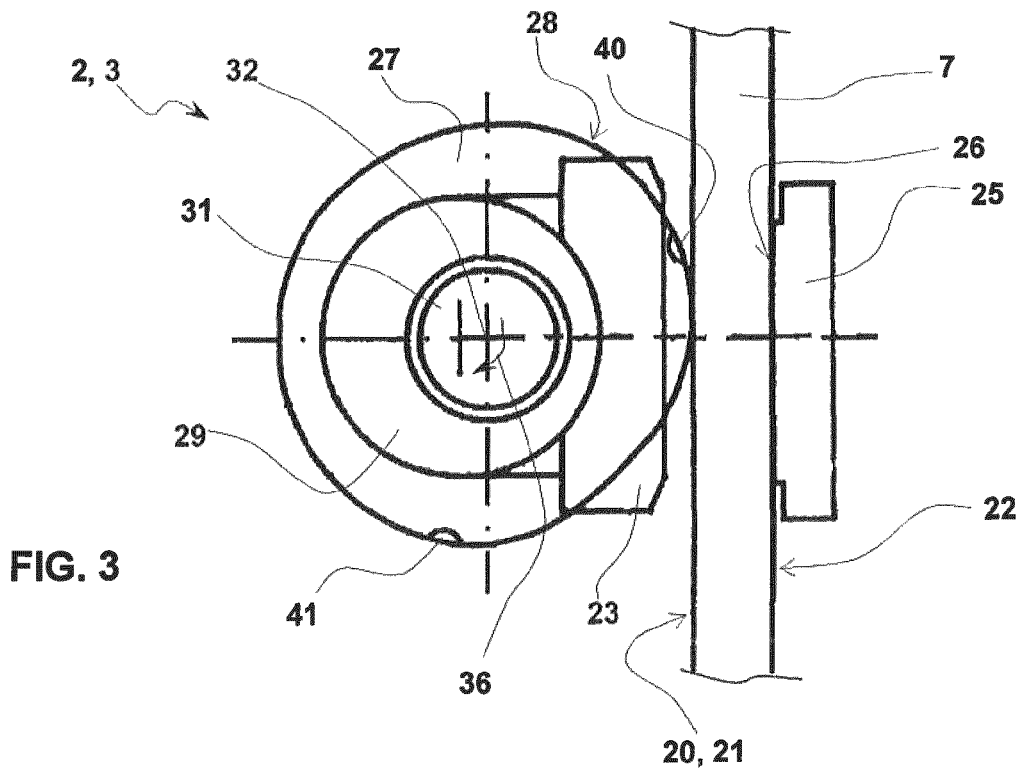
FIG. 3 shows the brake unit, which is illustrated in FIG. 2, in accordance with the first embodiment of the invention in a schematic illustration and in the manner of a detail, during triggering of the safety brake.

FIG. 3 shows the brake unit 3, which is illustrated in FIG. 2, of the elevator installation 1 according to the first embodiment in a schematic illustration and in the manner of a detail during triggering of the safety brake 2. Through triggering of the safety brake 2, the rolling disc 27 has rotated in the rotational direction 36. In that case, the rolling disc 27 rolls by its rolling element 28 along the rolling path 20 of the rail 7. As a result, in this embodiment initially the passive brake jaw 25 comes into contact, by its brake lining 26, with the further braking track 22 of the rail 7. For that purpose, the passive brake jaw 25 and the axle 31 are mounted on, for example, a common frame (not illustrated). In that case, a resilient mounting for the passive brake jaw 25 can also be realized, in which the passive brake jaw 25 is supported, for example, by way of a spring mounting on such a frame. The frame itself can then to a certain extent be mounted to be floating so that through rolling of the rolling disc 27 along the rolling track 20 of the rail 7 initially the rotational axis 32 is urged away from the rail 7 and the passive brake jaw 25 is led up to the rail 7 by way of the frame.

In the case of further rolling of the rolling disc 27 along the rolling track 20 of the rail 7 the active brake jaw 23 is then placed against the rolling track 20 of the rail 7 by way of the work eccentric 29. The active brake jaw 23 and the passive brake jaw 25 then act oppositely on the rail 7 so that a high level of braking force develops.

Marking elements 40, 41 are arranged at the rolling disc 27 or at the rolling element 28. The marking elements 40, 41 can be designed in suitable manner with respect to the respective use. In that case, the marking element 40 fulfils a marking function when the rolling disc 27 rotates in the rotational direction 36, whilst the marking element 41 fulfils a marking function when the rolling disc 27 rotates oppositely to the rotational direction 36. In the following, inter alia, the marking function of the marking element 40 is described. The marking function of the marking element 41 arises in corresponding manner.

Figure 4:
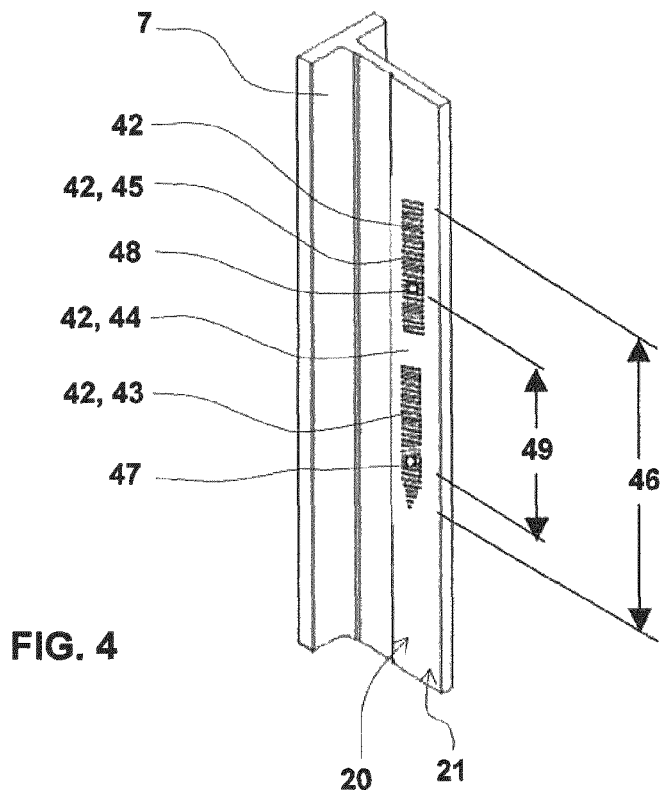
FIG. 4 shows the rail, which is illustrated in FIG. 2, with a characteristic groove pattern which arises on the rail in the case of triggering and subsequent release of the safety brake, in an idealized illustration.

FIG. 4 shows the rail 7 illustrated in FIG. 2, with a characteristic groove pattern 42 which arises on the rail 7 in the case of triggering and subsequent release of the safety brake 2, in an idealized illustration. In that regard, the groove pattern 42 has sections 43, 44, 45. The groove pattern 42 is in that instance generated in the sections 43, 45 by rolling out or rolling back of the rolling disc 27 and the corresponding rolling element 28 along the rolling track 20. Since the work disc 27 is rotated until the brake jaw 23 is pressed sufficiently strongly against the braking track 21 sliding or slipping of the rolling disc 27 at the rolling track 20 can occur in a section. The section 44 of the groove pattern 42, in which a sliding scratch pattern on the braking track 21 can be recognized, is formed by such sliding or slipping. In the case of creation of the groove pattern 42, the rolling element 28 on triggering is therefore rolled along the stationary rolling track 20 only in a section.

In the idealized illustration of the groove pattern 42 shown in FIG. 4 a length 46 of the groove pattern 42 can be readily recognized and thus precisely determined.

Due to the marking element 40 a start marking 47 arises during rolling out and an end marking 48 arises during rolling back. The marking element 40 can be designed in the form of, for example, a recess 40, particularly a bore 40, which is provided at the rolling element 28. An interruption of the grooves of the groove pattern 42 is thus recognizable at the markings 47, 48. The markings 47, 48 thus form marking places 47, 48 on the rolling track 20. The spacing 49 between these marking places 47, 48 can thus be precisely determined. The spacing 49 is a measure for the length 46 of the groove pattern 42. Since the length 46 depends on the braking slide, a conclusion about the braking slide can thus be made from the spacing 49.

Figure 5:
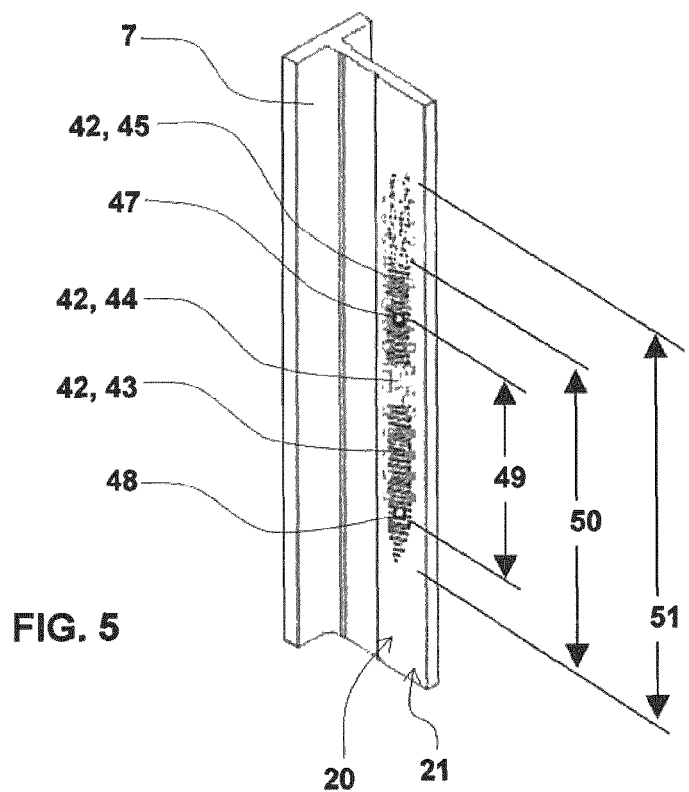
FIG. 5 shows the rail, which is illustrated in FIG. 2, with the characteristic groove pattern which arises on the rail in the case of triggering and subsequent release of the safety brake, in a schematic illustration which is, however, closer to reality.

FIG. 5 shows the rail 7, which is illustrated in FIG. 2, with the characteristic groove pattern 42 which arises on the rail 7 in the case of triggering and subsequent release of the safety brake 2, in an illustration which schematic, but closer to reality. The brake jaw 23 applied to the braking track 21 in practice obliterates the groove pattern 42 generated at the rolling track 20. In the illustration, which is schematic, but closer to reality, of the groove pattern 42 as shown in FIG. 5 thus—in contrast to the idealized illustration of the groove pattern 42 as shown in FIG. 4 the length 46—can no longer be determined. Length determinations such as can be undertaken by different persons can lead on one occasion to determination of the length 50 and on another occasion to determination of the length 51. Since there is a significant difference between the lengths 50, 51, the length determination is liable to a substantial degree of inaccuracy. However, even in the case of the groove pattern 42 as illustrated in FIG. 5 the marking points 47, 48 can be clearly recognized. The spacing 49 can therefore also be determined in practice with a high level of accuracy. Measurement of the length 46, which in a given case can be determined only with a high level of inaccuracy, of the groove pattern 42 can thus be eliminated. The braking slide can then be determined from the spacing 49 between the marking points 47, 48.

It is to be noted that the rolling element 28 can also be formed at a transport roller or the like. The rolling disc 27, a transport roller or the like, at which the rolling element 28 is formed, serves for applying and pressing the brake lining 24 against the braking track 21. In order to reset the safety brake 2, the rolling disc 27, a transport roller or the like is used again in order to transport the brake lining 24 back. In this embodiment, this mechanism is, inter alia, also realized by the work eccentric 29. The obliteration of the groove pattern 42 can, inter alia, also be produced during resetting of the safety brake 2. In that case, the rolling disc 27 together with the work eccentric 29 is rotated back again and the brake jaw 23 is relieved of load. The usually unclear imprint of the groove pattern 42 can thereby arise. In this instance this relates particularly to the section 45 of the groove pattern 42. However, depending on the respective design and mode of functioning the section 43 can also be concerned. In this embodiment the start marking 47 lies in the section 43, whilst the end marking 48 lies in the section 45.

The start marking 47 and the end marking 48 can, in particular, be realized in the form of rectangles, particularly squares, in the groove pattern 42. In that case, the marking places 47, 48 in one possible embodiment can be realized by interruptions or omissions of the grooves of the groove pattern 42. This can be realized by an appropriate recess, particularly bore, at the rolling element 28 of the rolling disc 27. In a modified embodiment, however, a significant depression in the rolling track 20 can be produced, which in each instance forms the marking place 47 or the marking place 48. In that regard, the marking places 47, 48 can be formed as rectangular, particularly square, depressions in the rolling track 20. Corresponding elevations, which form the marking elements 40, 41, can be provided for that purpose at the rolling disc 27 or the rolling element 28.

Thus, in this embodiment a marking element 40 is provided which during rolling of the rolling element 28 along the rolling track 20 produces the start marking 47 on the rolling track 20. Moreover, in the case of rolling back of the rolling element 28, in which the co-operation of the brake lining 24 with the stationary brake 21 is cancelled, the marking element 40 produces the end marking 48 on the rolling track 20. In that case, the marking element 40 produces the start marking 47 on the rolling track 20. Moreover, the marking element 40 produces the end marking 48 on the rolling track 20. The marking element 40 is in that regard provided at the rolling element 28. The marking element 40 is formed by a recess 40 in the rolling element 28. However, the marking element 40 can also be formed by an elevation 40 in the rolling element 28. In that case, the marking element 40 is arranged at a point of the rolling element 28 at which due to the gripping by the rolling element 28 with respect to the rolling path 20 already a substantial pressure is built up so that a clear impression results. The point of the rolling element 28 at which the marking element 40 is arranged is, however, rolled over in every instance on actuation of the braking unit so that during the actual braking it is no longer in the pressing region between rolling element 28 and rolling track 20. A clearly visible marking is thereby achieved.

The foregoing explanations relate to actuation of the brake unit in rotational direction 36. In that case the marking element 40 is used. Obviously, in reverse travel direction the same process takes place in reverse rotational direction, wherein then the marking element 41 comes into play instead of the marking element 40.

Figure 6:
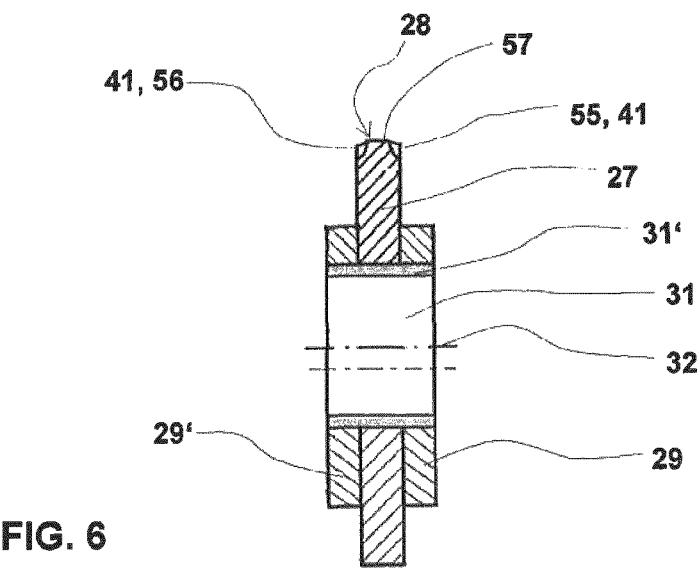
FIG. 6 shows the brake unit, which is illustrated in FIG. 2, in a schematic illustration in the manner of a detail in correspondence with a second embodiment of the invention.

FIG. 6 shows the brake unit 3, which is illustrated in FIG. 2, in a schematic illustration and in the manner of a detail in correspondence with a second embodiment. In that case, the rolling disc 27, the work eccentric 29 and a further work eccentric 29' are illustrated. The active brake jaw 23, which is illustrated in corresponding manner in, inter alia, FIG. 2, is actuated by way of work eccentrics 29, 29'. For simplification of the illustration, the brake jaw 23 is not illustrated in FIG. 6.

The rolling disc 27 has lateral recesses 55, 56 in the region of its rolling element 28. A narrowed section 57 is formed at the rolling element 28 between the lateral recesses 55, 56. In this embodiment the lateral recesses 55, 56 are formed as lateral notches. The narrowed section 57 is formed as a web-shaped section 57 of the rolling element 28. A marking element 41 is formed by the lateral recesses 55, 56. Obviously, the two marking elements 40, 41 are usually of identical form. The rolling disc 27 is joined to the two work eccentrics 29, 29' and mounted in common on the axle 31 by way of, for example, sliding bearing shells 31'.

Figure 7:
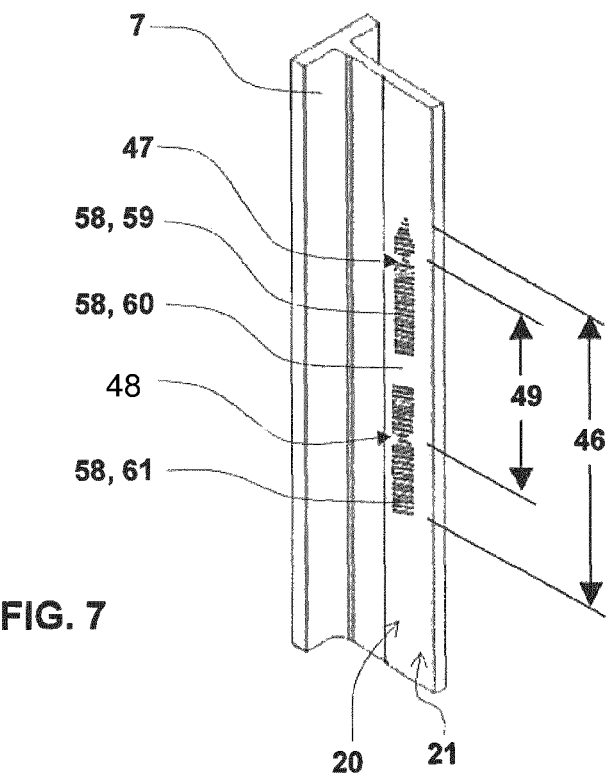
FIG. 7 shows the rail, which is illustrated in FIG. 2, with a characteristic groove pattern which arises on the rail in the case of triggering and subsequent release of the safety brake in accordance with the second embodiment, in an idealized illustration.

FIG. 7 shows the rail 7, which is illustrated in FIG. 2, with a characteristic groove pattern 58 which arises on the rail 7 in the case of triggering and subsequent release of the safety brake 2 in accordance with the second embodiment, in an idealized illustration. In this embodiment the groove pattern 58 is illustrated in a form which arises in the case of rolling of the rolling disc 27 together with the rolling element 28 along the rolling path 20 oppositely to the rotational direction 36 illustrated in FIG. 1. The groove pattern 58 has sections 59, 60, 61. The groove pattern 58 in the section 59 is produced by rolling of the rolling element 28 along the rolling track 20 when the safety brake 2 is triggered. If subsequently the brake jaw 23 is correspondingly pressed firmly against the braking track 21, then a certain degree of sliding of the rolling element 28 along the rolling track 20 occurs. This produces a sliding scratch, whereby the section 60 of the groove pattern 58 arises. When the safety brake 2 is triggered, return rolling of the rolling element 28 along the rolling track 20 takes place, whereby the groove pattern 58 in the section 61 is produced.

In the idealized illustration of FIG. 7, the length 46 of the groove pattern 58 is readily measurable and therefore determinable relatively precisely.

The marking element 41 generates in the groove pattern 58 characteristic markings 47, 48 in the form of marking places 47, 48. In that regard, the start marking 47 is produced on the rolling track 20 in the section 59 of the groove pattern 58. The end marking 48 is produced on the rolling track 20 on the section 61 of the groove pattern 58. A spacing 49, which can be precisely determined, arises between the start marking 47 and the end marking 48. In the idealized illustration, not only the length 46, but also the spacing 49 are suitable for determination of the braking slide.

Figure 8:
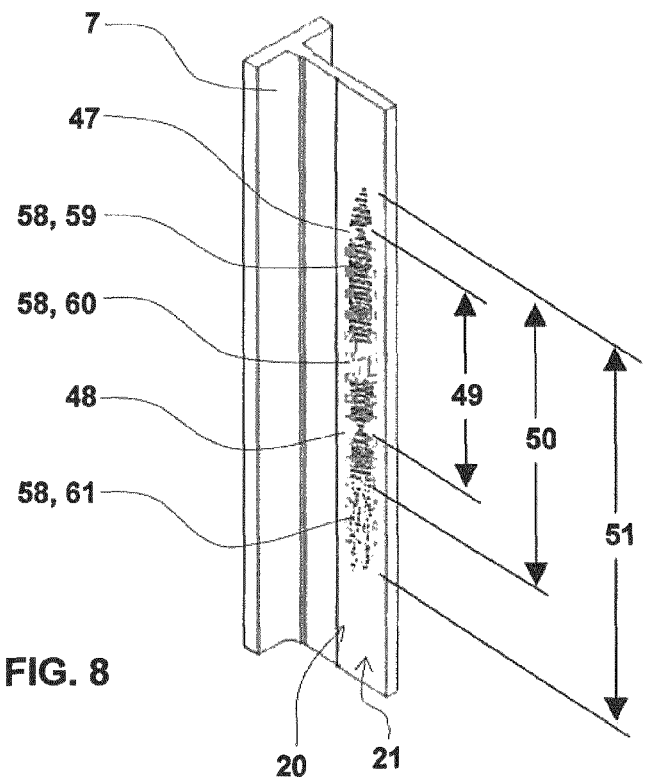
FIG. 8 shows the rail, which is illustrated in FIG. 2, with the characteristic groove pattern which arises on the rail in the case of triggering and subsequent release of the safety brake in accordance with the second embodiment, in a schematic illustration which is, however, closer to reality.

FIG. 8 shows the rail 7, which is illustrated in FIG. 2, with the characteristic groove pattern 58 which arises on the rail 7 in the case of triggering and subsequent release of the safety device 2 according to the second embodiment, in an illustration which is schematic, but closer to reality. In practice, the problem arises in determination of the braking slide from the length 46 (FIG. 7) that the length 46 of the groove pattern 58 can be determined only approximately or with a high degree of inaccuracy. Due to obliteration of the groove pattern 58, which can be produced by the co-operation of the brake jaw 23 with the rail 7, a comparatively large region arises for determination of the length 46 of the groove pattern 58. This region can extend from a minimum length 50 to a maximum length 51. The difference between the minimum length 50 and the maximum length 51 is a measure of the degree of inaccuracy in the determination of the length 46 under idealized conditions.

Conversely, the markings 47, 48 can be readily recognized not only in the case of idealized conditions as illustrated in FIG. 7, but also in practice as can be seen in the case of the illustration which corresponds with FIG. 8 and is closer to reality. The spacing 49 between the markings 47, 48 is therefore determinable with a significantly higher level of accuracy than the length 46 of the groove pattern 58.

The braking slide is thus in practice determinable from the spacing 49 or the corresponding distance between the markings 47, 48 with a significantly greater level of accuracy than is possible on the basis of the length 46 of the groove pattern 42.

Figure 9:
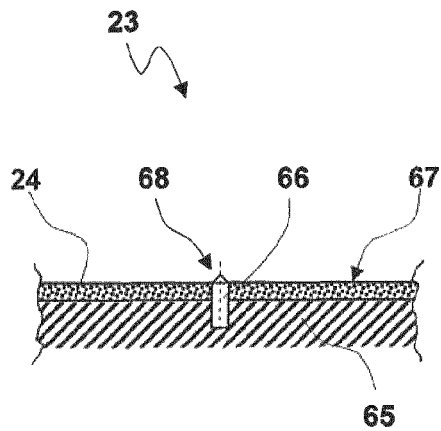
FIG. 9 shows a brake jaw of a brake unit in accordance with a third embodiment of the invention in a schematic sectional illustration and in the manner of a detail.

FIG. 9 shows a brake jaw 23 of a brake unit 3 according to a third embodiment in a schematic sectional illustration in the manner of a detail. In this embodiment the brake jaw 23 comprises a base body 65 on which a brake lining 24 is mounted. The brake lining 24 can be constructed as a soft metallic brake lining 24. In addition, a marking element 66 formed from a hard metallic material is provided. In that case, the marking element 66 is connected with the base body 65 or formed integrally with the base body 65. In this embodiment the marking element 66 extends somewhat over a surface 67 of the brake lining 24. The marking element 66 has a point 68 which, in this embodiment, is formed as conical point 68. The point 68 faces the braking track 21 of the rail 7. The marking element 66 can also be formed entirely or partly from a ceramic material.

Figure 10:
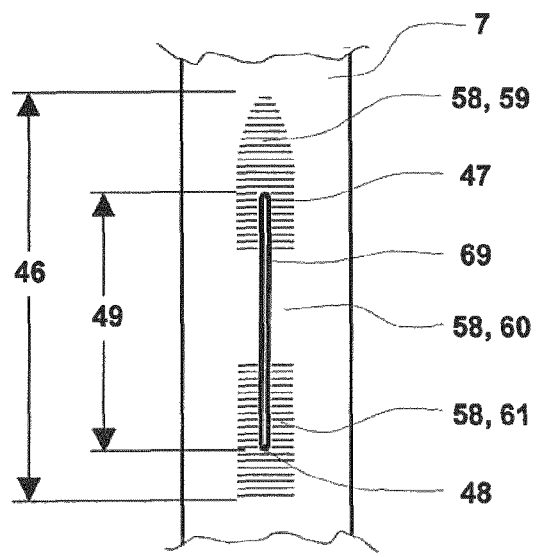
FIG. 10 shows the rail, which is illustrated in FIG. 2, with a characteristic groove pattern which arises on the rail in the case of triggering and subsequent release of the safety brake in accordance with the third embodiment, in an idealized illustration.

FIG. 10 shows the rail 7, which is illustrated in FIG. 2, with a characteristic groove pattern 58 which arises on the rail 7 in the case of triggering and subsequent release of the safety brake 2 according to the third embodiment, in an idealized illustration. The rolling track 20 and the braking track 21 can overlap entirely or partly. The groove pattern 58 is produced by the co-operation of the rolling element 28 of the rolling disc 27 with the rolling track 20 at the rail 7. In addition, through the application of the brake jaw 23 to the braking track 21 the point 68 also comes into contact with the braking track 21 so that a marking line 69 is produced on the braking track 21. The marking line 69 extends from a start marking 47 to an end marking 48.

In the idealized illustration a length 46 of the groove pattern 58 results. Due to the co-operation of the brake lining 24 with the rail 7, however, the groove pattern 58 is obliterated, as described in corresponding manner by way of FIGS. 5 and 8. Accordingly, in practice the length 46 can be determined only imprecisely. The length 46 is therefore usually not suitable for determination of the braking slide. However, the spacing 49 between the start marking 47 and the end marking 48 can be determined comparatively precisely. In this embodiment the spacing 49 is the same as the length 49 of the marking line 69. The spacing 49 between the markings 47, 48 or the length 49 of the marking line 69 is thus suitable for accurate determination of the braking slide.

In a modified embodiment the marking element 66 can also be provided in the form of a point 68 at the rolling disc 27 or at the rolling element 28. Depending on the respective embodiment, the start marking 47 and the end marking 48 can thus be produced on the rolling track 20 and/or the braking track 21. Moreover, it is also possible for the start marking 47 and the end marking 48 or the marking line 69 to be produced in corresponding manner on the further braking track 22. In addition, the marking line 69 can, depending on the respective concrete embodiment, be produced on the rolling track 20 and/or the braking track 21 as well as optionally on the further braking track 22.

In a further modification it is also conceivable for a marking element 40, 41, 66 to be detachably connected with the rolling element 28 or the respective brake lining 24, 26. The markings 47, 48 or the marking line 69 can thereby also be produced merely for the purpose of the test, wherein in that regard in a given case influence of the characterization (marking) on braking behavior has to be taken into consideration. This is to be noted particularly in the case of a marking element 66 with a point 68 when this is integrated in the brake lining 24, 26 and a marking line 69 is thus produced over the entire braking path.

In the method for determination of braking slide of the brake unit 3 of the safety brake 2 the following steps are carried out. Initially, triggering of the safety brake 2 takes place, for example in a test journey of the elevator car 6, wherein the rolling element 28 of the rolling disc 27 rolls at least partially along a stationary rolling track 20 and wherein through rolling of the rolling element 28 along the rolling track 20 the brake linings 24, 26 co-operate with the stationary braking tracks 21, 22. In addition, the start markings 47 as well as in a given case the marking line 69 and, when the safety brake is reset, the end marking 48 are produced on the rolling track 20 and/or the braking track 21 or the braking track 22 by a marking element 40, 41, 66 during rolling of the rolling element 28 along the rolling track 20. The spacing 49 between the start marking 47 and the end marking 48 or the length 49 of the marking line 69 can subsequently be measured. The braking slide can then be determined in suitable manner from this direct spacing 49 or the distance or length 49. The correlation with respect thereto can, for example, be filed in a mathematical function or a table. The authorized person can thus measure the spacing 49 with a high degree of accuracy and determine therefrom the braking slide with a correspondingly high level of accuracy.

The start marking 47 and optionally also the end marking 48 can alternatively be an electronic marking. In that regard, for example, the rolling element 28 includes a pressure-based wireless signal transmitter that issues a marking signal when it is rolled over against the rail 7. This can be, for example, a piezo-element for each of the marking elements 40, 41. A position of the elevator car 6 is detected, for example from the drive motor unit 13 or other suitable source, when this marking signal occurs and is output or stored as a start marking or, in the case of rolling back, as an end marking. The position can then be prepared in a positioning system present in the elevator system. In this solution a distance between the start marking and the end marking no longer has to be subsequently measured manually, but can be ascertained directly on the basis of the stored positional data of the elevator car 6. As shown in FIG. 1, a processor 70 is connected to the drive motor unit 13 to receive positional information of the elevator car 6. The processor 70 receives the marking signals from the signal transmitters 40, 41 and responds by storing the associated positional information in an electronic position memory 71. The positional information also, or in the alternative, can be displayed by a display device 72. The processor 70 calculates the braking slide of the elevator car 6 from a difference between the positional information of the electronic start marking 47 and the positional information of the electronic end marking 48.

The invention is not restricted to the described embodiments and the mentioned modifications.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. A method for determining a braking slide of an elevator car of an elevator installation, which slide is caused by a brake unit of a safety brake of the elevator car, the method comprising the following steps:
    triggering the safety brake of the elevator car, wherein a rolling element of the brake unit rolls at least partially along a stationary track on a rail adjacent to the elevator car; and
    producing a start marking with a marking element of the brake unit during rolling of the rolling element along the track.

2. The method according to claim 1 wherein the start marking is produced on the track.

3. The method according to claim 2 wherein the track is at least one of a rolling track and a braking track on the rail.

4. The method according to claim 1 wherein the marking element is arranged at the rolling element.

5. The method according to claim 1 wherein the marking element is a recess formed in the rolling element.

6. The method according to claim 1 wherein the marking element is connected to a brake jaw of the brake unit and has a point facing the track.

7. The method according to claim 1 including the following further steps:
    resetting the safety brake by moving the elevator car in resetting travel direction, wherein the rolling element is rolled back along the track;
    producing an end marking by the marking element during the rolling of the rolling element back;
    determining a distance between the start marking and the end marking; and
    determining the braking slide of the elevator car in dependence on the determined distance.

8. The method according to claim 7 wherein the start marking and the end marking are produced on the track.

9. The method according to claim 7 including producing a marking line on the track between the start marking and the end marking by the marking element wherein the determined distance is a length of the marking line.

10. The method according to claim 7 including the following further steps:
    producing at least one of the start marking and the end marking as a marking signal with the marking element of the brake unit during rolling of the rolling element along the track;
    associating positional information of the elevator car with the marking signal;
    at least one of storing the associated positional information and displaying the associated positional information; and
    using the associated positional information to determine the braking slide.

11. The method according to claim 10 including calculating the braking slide of the elevator car from a difference between the positional information associated with the start marking signal and another positional information associated with an end marking signal produced by the marking element.

12. The method according to claim 10 wherein the marking element includes at least one pressure-based signal transmitter.

13. The method according to claim 12 wherein the at least one pressure-based signal transmitter is a piezo-element.

* * * * *